United States Patent
Sitzlar

[11] 4,246,886
[45] Jan. 27, 1981

[54] FREEZE PROTECTED HOT WATER SOLAR HEATING APPARATUS

[76] Inventor: Rondal Sitzlar, Rte. 2, Syringa St., Boise, Id. 83703

[21] Appl. No.: 961,939

[22] Filed: Nov. 20, 1978

[51] Int. Cl.³ .............................................. F24J 3/02
[52] U.S. Cl. ..................... 126/420; 126/427; 126/422; 126/437; 122/20 B; 165/DIG. 2
[58] Field of Search ............... 126/418, 420, 421, 422, 126/427, 428, 430, 437, 419; 137/59; 122/301, 20 B; 165/DIG. 2

[56] References Cited

U.S. PATENT DOCUMENTS

| | | | |
|---|---|---|---|
| 3,977,601 | 8/1976 | Bearzi | 126/421 X |
| 4,044,819 | 8/1977 | Cottingham | 126/427 X |
| 4,052,001 | 10/1977 | Vogt | 126/427 X |
| 4,121,566 | 10/1978 | Radenkovic | 126/422 X |
| 4,153,104 | 5/1979 | Ruder | 126/422 X |
| 4,157,706 | 6/1979 | Gaskill | 122/20 B X |
| 4,159,017 | 6/1979 | Novi | 126/427 X |
| 4,169,554 | 10/1979 | Camp | 126/427 X |

*Primary Examiner*—Samuel Scott
*Assistant Examiner*—Lee E. Barrett
*Attorney, Agent, or Firm*—Paul F. Horton

[57] ABSTRACT

Freeze protected hot water solar heating apparatus for providing room heating and domestic hot water service comprising a solar heat collector, a water storage tank, a freeze protector, a fuel burning boiler, a heat exchanger, in-line sensors, and pumps for circulating the water. The freeze protector is in heat transference contact with the flue of the boiler. The freeze protector, controlled by a temperature sensor, prevents freezing of the water in the solar collector and additionally utilizes waste heat from the flue of the boiler to heat water anytime the boiler is in operation. The boiler is activated, upon the water in the water tank falling below a predetermined temperature. A thermostat controlled fan forces air over the heat exchanger to provide room heating. Check valves are provided for preventing back flow of water from the solar collector. The apparatus may also contain a heat pump having its heat transference coils adjacent to the heat exchanger for full utilization of forced air from the fan.

13 Claims, 3 Drawing Figures

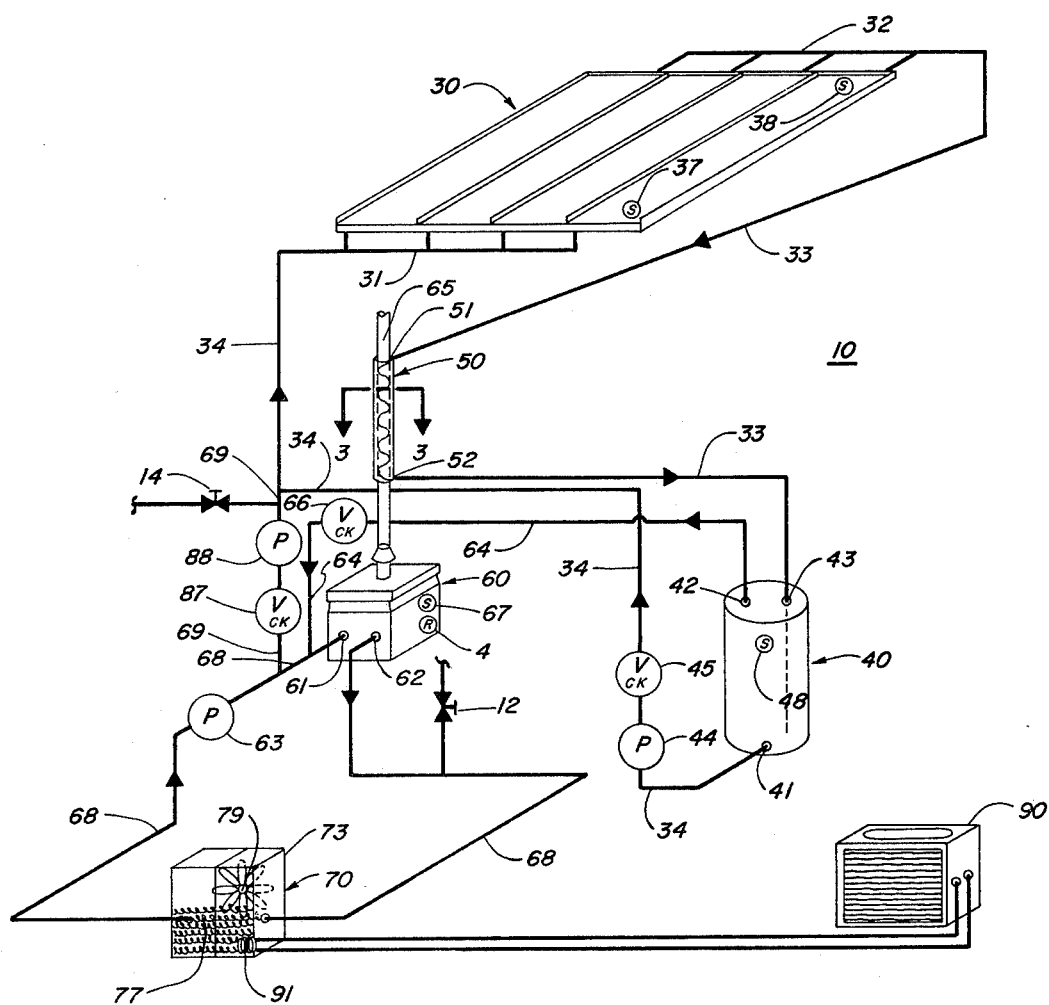
FIG. 1
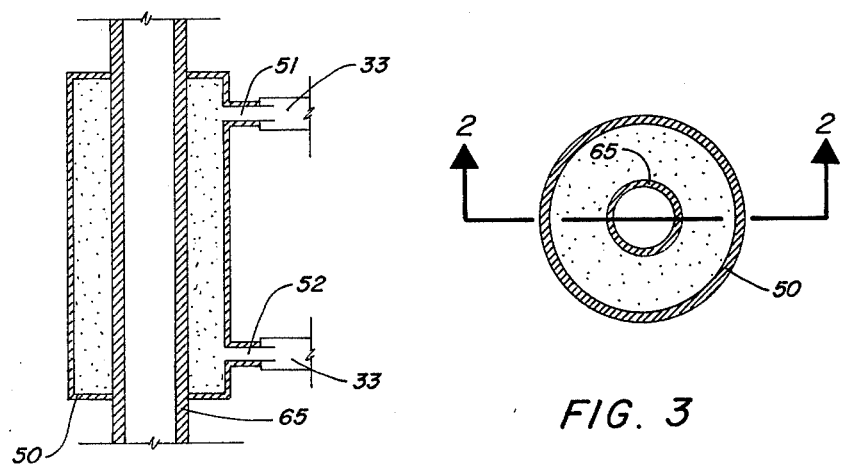
FIG. 2
FIG. 3

FREEZE PROTECTED HOT WATER SOLAR HEATING APPARATUS

BACKGROUND OF THE INVENTION

1. Field of the Invention

The present invention relates generally to apparatus for collecting, storing, and transmitting solar heat, and more particularly to apparatus for directly heating water including means to prevent freezing of the water contained within the solar collector.

2. Description of the Prior Art

The desirability of utilizing solar energy for heating purposes and for domestic hot water have long been recognized. Systems for both heating and providing domestic hot water primarily utilize air or a liquid anti-freeze for transference of heat from the solar collector to a storage tank. In such systems, a heat exchange system is needed to transfer the heat from the air or liquid to the water to be used. The cost and potentially dangerous problem of water contamination have resulted in more recently developed systems wherein water is circulated through the collector and the problems associated with the heat exchanger are eliminated. Most recent efforts in this regard are typified by U.S. Pat. No. 4,044,754 to Cronin, et al; U.S. Pat. No. 3,989,032 to Harrison; and U.S. Pat. No. 3,986,049 to Schlesinger. Cronin teaches apparatus for draining the collector to prevent freezing. Harrison teaches uses of an inflatable member which is collapsible to prevent bursting of tubes in the metal collector and Schlesinger teaches circulation of previously stored hot water or water heated by an electric heater to prevent freezing of the water in the collector. Such systems often result in extended periods of non-use of the solar collector and result in loss of heat already stored to prevent freezing of the water within the collector.

SUMMARY OF THE INVENTION

The present invention comprises a solar heating and domestic hot water system utilizing only water as the circulating medium and includes a solar collector, a freeze protector, a storage tank, a fuel fired boiler having a flue in heat transfering contact with a freeze protector and a loop house heating system with a domestic water take-off. A more thorough definition may be found in the appended claims.

It is therefore a general object of the present invention to provide a solar heating and domestic hot water system having a freeze protector.

A further object of the present invention is to provide a solar heating and domestic hot water system wherein the freeze protector derives its heat from waste heat of a boiler flue.

A more particular object of the present invention is to provide a solar heating and domestic hot water system wherein the freeze protector is in heat conductive contact with the flue of a fuel burning boiler.

Another object of the present invention is to provide a solar heating and domestic hot water system wherein the freeze protector may be operated independently from the household heating and domestic water system.

Additional objects and advantages will become apparent and a more thorough and comprehensive understanding may be had from the following description taken in conjunction with the accompanying drawings forming a part of this specification.

BRIEF DESCRIPTION OF THE DRAWINGS

FIG. 1 is a schematic of one embodiment of the present invention.

FIG. 2 is a sectional view of one embodiment of the freeze protector of the present invention, along lines 2—2 of FIG. 3.

FIG. 3 is a sectional view of the freeze protector as shown from the top.

DETAILED DESCRIPTION OF THE INVENTION

Referring now to the drawings, and more particularly to FIG. 1, an embodiment to be preferred of solar heating apparatus 10 made according to the present invention is disclosed. Apparatus 10 includes a solar heat collector 30, water storage means 40, freeze protector 50, boiler 60, and a heat exchanger 70.

The particular type of solar collector used in the present invention is unimportant; any of a number of conventional collectors having a closed tubular system for liquids being satisfactory. In the preferred embodiment the collector is of the type generally known as the variegated flat plate collector. The collector may be of any suitable size and preferably has an inlet manifold 31 and an outlet manifold 32 with a plurality of parallel located tubes, not shown, having exterior heat absorbtive surfaces, extending there between. Collector 30 may be mounted on the roof top of an existing structure or in any other suitable manner, preferably providing maximum exposure to the sun.

Freeze protector 50 is mounted in heat conductive contact with flue 65 of boiler 60. The freeze protector may take the form of a metallic coil, such as copper, wound tightly about the flue to provide maximum contact area. In another embodiment, freeze protector 50 may take the form of a manifold surrounding and in heat conductive contact with flue 65, as shown to advantage in FIGS. 2 and 3. Flue 65 may be constructed of iron, aluminum, or any other suitable heat conductive metal. Freeze protector 50 may be connected in the inlet line 34 of the solar collector or the outlet line 33, as is preferred, and as shown to advantage in FIG. 1. Outlet line 33 extends from outlet manifold 32 of solar collector 30 to intake port 51 of the freeze protector and from outlet port 52 of the freeze protector to inlet 43 of water storage tank 40.

Water tank 40 is provided with one water inlet 43 and two water outlets; first outlet 41 and second outlet 42. Water tank 40 may be of any convenient size with a tank holding at least 120 gallons being preferred. Water tank 40 is conventional in nature and preferably contains an insulative coating.

First outlet 41 is in fluid communication with inlet manifold 31 of solar collector 30 by means of connecting water line 34. Water circulation from solar collector 30 through freeze protector 50 into water tank 40 and back to the solar collector is thereby provided. A conventional in-line water pump, designated as first pump 44, is located within line 34 to provide the circulation. In addition, a first check-valve 45 may be provided in line 34 to prevent back flow of the water from inlet 31 of the solar collector to tank 40. First pump 44 may be controlled by a pair of sensing elements, located within or adjacent to the solar collector, and designated by the numerals 37 and 38. Sensor 37 is operable to activate pump 44 upon the temperature of water, contained within the tubes of the solar collector, falling below a selected temperature level, as for example 37 degree Fahrenheit. Sensor 38 is operable to activate pump 44 when the temperature of water, contained within the tubes of the solar collector, rises above a selected level, as for example 58° F. Pump 44 is therefore inactive, in the example cited, between temperatures of 37° F. and 58° F.

Second outlet 42 of water tank 40 is connected to inlet 61 of boiler 60 by means of water line 64. Line 64 is equipped with a conventional check valve 66 to prevent backflow of water from the inlet of boiler 60 to the outlet 42 of storage tank 40.

Boiler 60 is a conventional, fuel burning, boiler utilizing preferably natural gas as a fuel. It is to be understood that boiler 60 may also burn wood, coal, oil, or other conventional fuels. The boiler includes an inlet port 61 and an outlet port 62. Connected between the inlet and outlet ports of boiler 60 is a loop line 68 in fluid communication with one or more heat exchange units 70 for heating the interior of a dwelling. A loop pump, designated as second pump 63, is provided for circulating water through inlet 61, the boiler, where it may be heated, outlet 62, line 68, the heat exchanger 70, and back to inlet 61 of the boiler. Loop pump 63 is preferably in constant operation, but may be provided with a conventional on-off switch.

Heat exchanger 70 may be provided with a housing 73 covering heat transference coils 77 or other conventional radiator elements. Exchanger 70 also preferably includes a fan 79 operable to force room air by and about the radiator or coils to augment heat exchange between the heat exchanger and room air. The fan may be controlled by a thermostat, not shown, set at a selected temperature level, as is conventional in the art. Apparatus 10 may also be provided with a conventional air-conditioning unit or heat pump, designated by the numeral 90, having heat transference coils 91 within or adjacent to heat exchanger 70 whereby the same fan 79 which is utilized to force air by the heat exchanger is also operable to force air by the transference coils 91 of unit 90. A suitable thermostat may also be provided operable to activate the fan when unit 90 is in the cooling mode.

A connector line 69 is provided between line 68 adjacent inlet 61 of boiler 60 and line 34 leading to inlet manifold 31 of collector 30, as shown to advantage in FIG. 1. Located within line 69 is a check valve 87 to prevent backflow of water from collector 30 to inlet 61 of boiler 60, and a third pump 88 operable to circulate water from loop line 68 through collector 30, heat exchanger 50, storage tank 40, boiler 60, heat exchanger 70, and back through line 68 to its point of origin. Pump 88 is preferably controlled by a sensor 48 located in water tank 40. Sensor 48 may activate pump 88 at a selected temperature, as for example, 150° F., in order to pull the hot water from tank 40 through the boiler and therefore through the heat exchanger 70. Boiler 60 is provided with a thermostat 67 having a lower setting than sensor 48, as for example 140° F., controlling the firing of the boiler. In addition, boiler 60 is provided with a relay 4, conventional in nature, which activates first pump 44 any time the boiler is in operation, thereby utilizing the otherwise wasted heat going up flue 65.

Domestic hot water may be extracted from the system by means of a tap 12 taken off loop line 68. Water is replenished to the closed system by means of a cold water makeup line 14 preferably connected to line 69, as shown to advantage in FIG. 1. It is to be understood that the cold water makeup line may tap into the system at any desirable location, as for example the water tank.

In operation, water enters the system through cold water makeup line 14 which feeds to solar collector 30 by means of line 34. The water is heated in the solar collector and is routed through heat exchanger 50 to storage tank 40. In the present illustration, should the temperature of the water drop below 37° F. pump 44 is activated by sensor 37 to circulate water from the storage tank back through collector 30 thereby preventing freezing of the water in the tubes of collector 30. Should the temperature be between 37° F. and 58° F. first pump 44 will be inactivated and should the temperature be over 58° F. as sensed by sensor 38 first pump 44 will again be activated circulating water through the solar collector to be heated by the sun. Water from tank 40 will be routed through second outlet 42 and into the boiler loop system only should the temperature of the water in the storage tank be above 150° F. as sensed by sensor 48 controlling third pump 88 or upon withdrawal of domestic hot water through tap 12. Should the temperature of the water circulating through boiler 60 drop below 140° F., the boiler automatically fires heating the water to, for example, 150° F., thereby providing adequate heat through heat exchanger 70. In addition, relay 4 activates first pump 44 to cause circulation of water from the storage tank through outlet 41 through solar collector 30 and through heat exchanger 50 where waste heat is absorbed by the freeze protector and thence back to storage tank 40 through inlet 43. As previously mentioned, water is preferably continually circulating through line 68 and through heat exchanger 70 back to the boiler. A thermostat controlled fan 79 is operable to force air by heat transference coils 77 of heat exchanger 70 to heat a room. Optical heat pump 90 may provide additional heat through coils 91, if desired. In summertime heat pump or air-conditioner 90 may cool heat transferring coils 91 for colling the interior of a room.

Having thus described in detail a preferred selection of embodiments of the present invention, it is to be appreciated and will be apparent to those skilled in the art that many physical changes could be made in the apparatus without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

I claim:

1. Freeze protected hot water solar heating apparatus comprising:

a solar heat collector having an inlet and an outlet;

water storage means including an inlet and a first and second outlet, the inlet in fluid communication with the outlet of said collector and the first outlet in fluid communication with the inlet of said collector;

a freeze protector located between and in fluid communication with said collector and said storage means;

first pump means operable to circulate water through the collector, freeze protector, and water storage means;

a first sensor operable, once the water temperature in said solar heat collector drops below a preselected value, to activate said first pump to circulate heated water through said collector to prevent freezing of the water in said collector;

a fuel burning boiler having a flue in heat transfering contact with said freeze protector, said boiler having an inlet and an outlet, the inlet in fluid communication with the second outlet of said water storage means and the inlet of said collector;

at least one heat exchanger connected between and in fluid communication with the inlet and outlet of said boiler;

second pump means operable to circulate water through said heat exchanger; and third pump means operable to circulate water through said collector, freeze protector, water storage means, boiler, and heat exchanger.

2. The apparatus as described in claim 1, further comprising:

means for withdrawing domestic hot water adjacent said heat exchanger and means for replacing water so withdrawn.

3. The apparatus as described in claim 1, wherein said freeze protector is located between the outlet of said collector and the inlet of said water storage means.

4. The apparatus as described in claim 1 further comprising a check valve located between the inlet of said collector and the first outlet of said storage means and operable to prevent water flow from the collector inlet to the first outlet of said storage means.

5. The apparatus as described in claim 1 further comprising a second sensor for sensing the temperature of water in the water storage means and operable to activate said third pump means at a selected temperature.

6. The apparatus as described in claim 5 further comprising a check valve located between the inlet of said collector and the inlet of said boiler and operable to prevent water flow to said boiler inlet from said collector inlet.

7. The apparatus as described in claim 1 further comprising a check valve located between the inlet of said boiler and the second outlet of said water storage means and operable to prevent water flow from the inlet of said boiler to the second outlet of said water storage means.

8. The apparatus as described in claim 1 further comprising an electrical relay operable to activate said first pump means upon firing of said boiler.

9. The apparatus as described in claim 1 further comprising a thermostatic controlled fan adapted to force air about said heat exchanger at a selected temperature.

10. The apparatus as described in claim 9 further comprising thermostatic controlled air conditioning apparatus having heat transference coils located adjacent said heat exchanger.

11. Freeze protected hot water solar heating apparatus comprising:

a solar heat collector having an inlet and an outlet;

water storage means including an inlet and a first and second outlet, the inlet in fluid communication with the outlet of said collector and the first outlet in fluid communication with the inlet of said collector;

a freeze protector located between and in fluid communication with the outlet of said collector and the inlet of said water storage means;

first pump means operable to circulate water through the collector, freeze protector, and water storage means;

a first sensor operable, once the water temperature in said solar heat collector drops below a preselected value, to activate said first pump to circulate heated water through said collector to prevent freezing of the water in said collector;

a fuel burning boiler having a flue in heat transfering contact with said freeze protector, said boiler having an inlet and an outlet, the inlet in fluid communication with the second outlet of said water storage means and the inlet of said collector;

at least one heat exchanger connected between and in fluid communication with the inlet and outlet of said boiler;

second pump means operable to circulate water through said heat exchangers;

third pump means operable to circulate water through said collector, freeze protector, water storage means, boiler, and heat exchangers;

a check valve located between the inlet of said collector and the first outlet of said storage means and operable to prevent water flow from the collector inlet to the first outlet of said storage means;

a second sensor for sensing the temperatures of water in the water storage means and operable to activate said third pump means at a selected temperature;

a second check valve located between the inlet of said collector and the inlet of said boiler and operable to prevent water flow to said boiler inlet from said collector inlet;

a third check valve located between the inlet of said boiler and the second outlet of said water storage means and operable to prevent water flow from the inlet of said boiler to the second outlet of said water storage means; and an electrical relay operable to activate said first pump means upon firing of said boiler.

12. The apparatus as described in claim 11 further comprising at least one fan operable to force air about said heat exchangers and a thermostat operable to control said fan.

13. The apparatus as described in claim 11 further comprising air conditioning apparatus having a heat transference coil located adjacent selected heat exchangers.

* * * * *